United States Patent

[11] 3,561,508

| [72] | Inventor | Friedrich Karl Holzwarth<br>Winnenden, Germany |
|---|---|---|
| [21] | Appl. No. | 762,414 |
| [22] | Filed | Sept. 25, 1968 |
| [45] | Patented | Feb. 9, 1971 |
| [73] | Assignee | Firma OKU-Automatik<br>Otta Kurz, Rosenstrasse, Germany |

[54] APPARATUS FOR AUTOMATICALLY SCREWING SCREWS INTO WORKPIECES
2 Claims, 4 Drawing Figs.

| [52] | U.S. Cl. | 144/32 |
|---|---|---|
| [51] | Int. Cl. | B25b 23/00 |
| [50] | Field of Search | 144/32, 32 (S); 206/56 (DF) |

[56] References Cited
UNITED STATES PATENTS

| 2,843,166 | 7/1958 | Van Alstyne | 144/32 |
| 3,233,752 | 2/1966 | Lagler et al. | 214/1 |
| 3,279,045 | 10/1966 | Dixon | 144/32X |

*Primary Examiner*—Gerald A. Dost
*Attorney*—Watson, Cole, Grindle & Watson

ABSTRACT: A machine for feeding one screw after another from a magazine to a point laterally adjacent to and underneath a rotating screwdriving tool, then picking up one screw by means of a pair of tongs and shifting these tongs to a position in axial alignment with the tool and a bore in a workpiece, then lowering the tool toward the workpiece so as first to insert the tip of the tool into the screw slot and to turn the screw before it engages with the workpiece and while still held in the tongs, and then starting to screw the screw into the bore, then opening the tongs and returning them to their original position ready to pick up the next screw while the first screw is fully screwed into the workpiece.

INVENTOR.
F. K. Holzwarth 3,561,508

APPARATUS FOR AUTOMATICALLY SCREWING SCREWS INTO WORKPIECES

The present invention relates to an apparatus for automatically screwing screws into workpieces or the like, and it is the principal object of the invention to provide such an apparatus which is adapted to convey the screws successively from a magazine to a position near a workpiece, then to take one screw at a time and to apply it automatically upon the end of a bore in the workpiece, and then to turn the screw so as to screw it fully into the workpieces.

Another object of the invention is to provide such an apparatus which is adapted to hold and screw into a workpiece any kinds of screws with or without heads and even headed screws with very short shanks, and also permits such screws to be screwed into bores which are not easily accessible.

A further object of the invention is to provide such an apparatus which insures that, when it first applies a screw upon a workpiece, such a screw will not tilt but will always be in axial alignment with the bore into which it is to be screwed and will thus thereafter be properly screwed into this bore.

According to the invention, these objects are attained by providing the apparatus with a pair of tongs for gripping and releasing a screw, with a spreading element for opening and closing the tongs so as to receive and to release the screw, with a lever on which the tongs are mounted and which is adapted to pivot the tongs from a receiving position, in which the tong jaws are laterally spaced from a screwdriving tool and are adapted to receive and grip a screw from the end of a screw supply rail or similar device coming from a magazine, to a position in which the screw is in axial alignment with this tool and the bore into which it is to be screwed, and with suitable means for moving the tongs on the mentioned lever in a direction parallel to the pivot axis of the lever.

By means of the tongs, a screw is therefore picked up from the end of the supply rail or similar device and, while being firmly held by the tongs, it is conveyed to a position in alignment with the screwdriving tool and the bore into which it is to be screwed. The screwdriving tool is then inserted into the slot of the screw so as to rotate the latter while it is still being held by the tongs, and the rotating screw is then applied upon the end of the bore into which it is to be screwed. This prevents the screw from tilting when first engaging with the workpiece. After the screw has been screwed for a short distance into the bore, the tong jaws are spread apart by the spreading element so as to release the screw. While the screwdriving tool continues to turn the screw to screw it fully into the workpiece, the tongs are returned to their original position to pick up the next screw from the end of the supply rail or the like. Thus, there is no time wasted for this return movement and as soon as one screw has been fully screwed into the workpiece and the screwdriving tool has been retracted and been placed in alignment with the next open bore of the workpiece, the next screw may be inserted. The tongs may be made of different constructions and may also be designed to permit the screws to be screwed into bores in positions which are not easily accessible. If screws of a different length are to be screwed into a workpiece, there is no need first to carry out any adjustments on the apparatus, while for the insertion of screws of a different diameter it is only necessary to exchange the tongs and the screwdriving tool or only the tip thereof which is to be inserted into the screw slots.

According to another feature of the invention, the tongs are of a very simple and foolproof construction and are provided with a spring which tends to close the tong jaws, while the spreading element is located between the tong arms so that when turned at a certain angle about its axis, it spreads the tong arms apart and thus opens the tong jaws.

These and numerous additional features and advantages of the present invention will become further apparent from the following detailed description thereof which is to be read with reference to the accompanying drawings, in which:

FIG. 3 shows a cross section which is taken along the line III–III of FIG. 1; while

Figure 1:
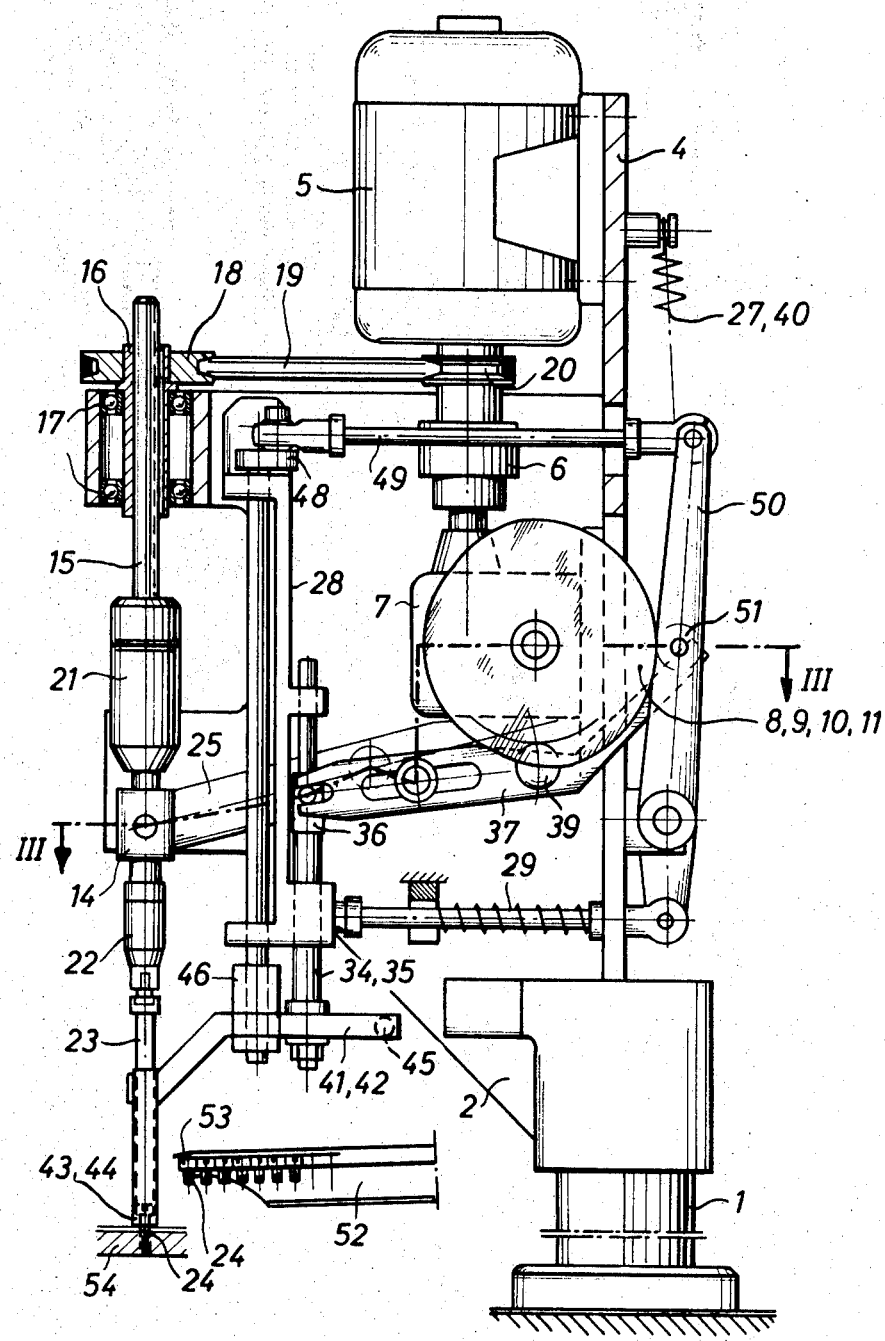
FIG. 1 shows a side view of the apparatus from which one sidewall has been removed and as seen in accordance with a cross section which is taken along the line I–I of FIG. 3.

As illustrated in the drawings, the apparatus according to the invention comprises a post 1 on which two sidewalls 2 and 3 and a rear wall 4 are secured. This rear wall 4 carries a motor 5 with a downwardly projecting shaft which is connected by a coupling 6 to a speed-reduction gear 7. The driven shaft of this gear projecting from its opposite sides carries on each side a pair of cam plates 8, 9 and 10, 11 respectively.

At the front side of the apparatus opposite to the rear wall 4, the two sidewalls 2 and 3 are provided with opposite guide members 12 and 13 on which a bearing 14 for a screwdriving shaft 15 is mounted so as to be slidable in its axial direction. The upper part of this shaft 15 extends through a bushing 16 in which it is slidable in its axial direction without being rotatable relative thereto. Bushing 16 is rotatably mounted in ball bearings 17 and is secured to a pulley 18 which is connected by a V-belt 19 to a pulley 20 on the shaft of motor 5 so as to be driven by the latter. The separate upper and lower parts of shaft 15 are connected between the bearings 14 and 17 by an adjustable overload clutch 21. Underneath the bearing 14, shaft 15 carries a holding appliance 22 into which one end of a screwdriving tool 23 may be removably inserted and locked. The lower end of this tool 23 is provided with a flat projecting tip which is adapted to be inserted into the slot of a screw 24.

For shifting the screwdriving shaft 15 carrying the tool 23 in its axial direction, a lever 25 is provided which is pivotably mounted on a bearing which is adjustable to different positions on the sidewall 2 by means of a bolt 26 which when released may be shifted along corresponding slots in sidewall 2 and in the lever 25. Lever 25 carries a roller 26a which under the action of a spring 27 engages upon and rolls along the cam plate 9 when the latter is rotated.

Adjacent to the ball bearings 17 a lever 28 is pivotably mounted at one end on the sidewalls 2 and 3, while its other end engages with one end of a pivotable rod 29. Rod 29 is surrounded by a coil spring 31 one end of which is connected to a stop member 30 which is secured to sidewall 2, while its other end acts upon the other end of rod 29 which is pivotably mounted on one end of a two-armed lever 32 which is pivotably mounted on the rear wall 4. The other end of lever 32 carries a roller 33 which under the action of spring 31 engages upon cam plate 8.

On the free end of lever 28 and substantially centrally of its width two shafts 34 and 35 are mounted in a position parallel to the longitudinal axis of this lever and so as to be slidable in their axial direction. These two shafts 34 and 35 which are thus pivotable together with lever 28 are connected to each other by a connecting member 36 in which the shafts are rotatably mounted but relative to which they are substantially immovable in their axial directions. This connecting member 36 is in pivotable engagement with one end of a shifting lever 37 which is pivotably mounted on a bearing, not shown, which is adjustable to different positions on the sidewall 3 by means of a bolt 38 which when released may be shifted in corresponding slots in sidewall 3 and lever 37. The shifting lever 37 carries a roller 39 which under the action of a spring 40 engages upon cam plate 10.

The lower end of each of the pivotable shafts 34 and 35 carries rigidly thereon a pair of tong arms 41 or 42, respectively, for gripping one of the screws 24. Between the other ends of the tong arms 41 and 42 a compression spring 45 is mounted, while a spreading member 46 of a rectangular cross section acting as a cam is located between the tong arms 41 and 42 at the other side of their points of connection to the shafts 34 and 35.

Spreading member 46 is secured to the end of a shaft 47 which is rotatably mounted at the side of lever 28 opposite to that on which the shafts 34 and 35 are mounted. At a point of shaft 47 adjacent to the pivot bearing of lever 28 this shaft is eccentrically connected by an arm 48 to a swivel rod 49 which is pivotably connected to the upper end of a lever 50 which is pivotably mounted on the rear wall 4 and carries a roller 51 which engages upon the cam plate 11.

Underneath the tongs 41 to 44 a feed rail 52 is provided which is connected to a screw magazine, not shown, and in which the screws 24 are slidable in a row behind each other. The first screw 24 of this row is prevented from falling out of the open end of feed rail 52 by being held by the downwardly bent front end of a resilient cover plate 53.

Figure 2:
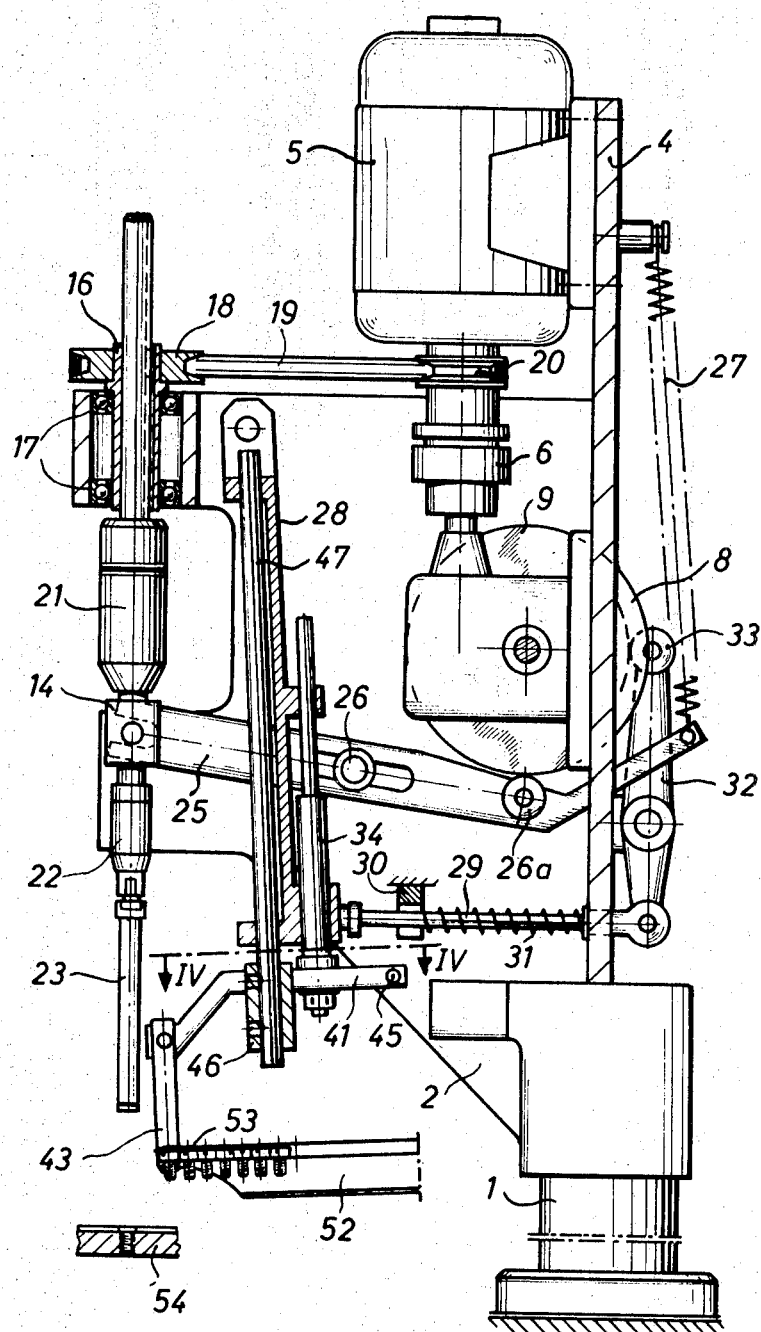
FIG. 2 shows a cross section which is taken along the line II–II of FIG. 3 of the apparatus from which a few parts are omitted for the purpose of a better illustration.
Figure 3:
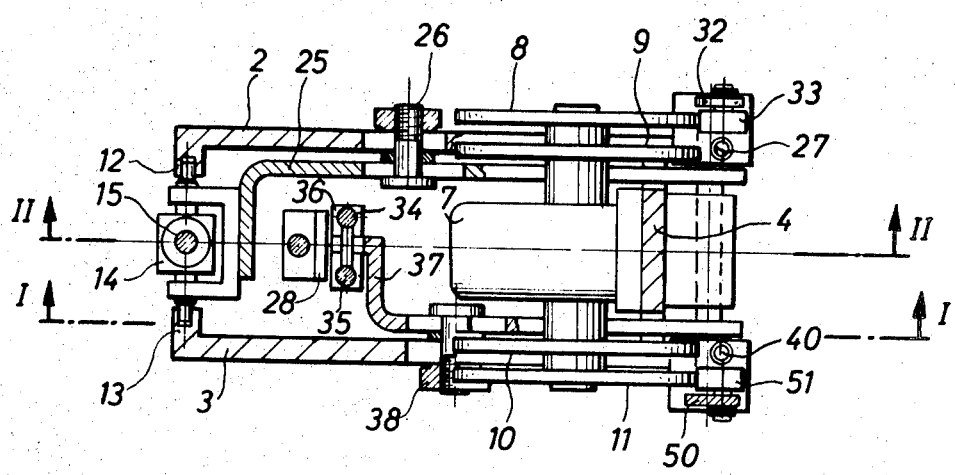
Figure 4:
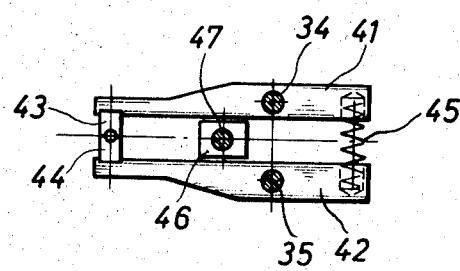
FIG. 4 shows a cross section which is taken along the line IV–IV of FIG. 2.

At the beginning of each operation of the apparatus, the two tong jaws 43 and 44 are located laterally adjacent to the first screw in feed rail 52 and are spread apart by the spreading member 46 which is turned about its axis by shaft 47. For gripping the screw by means of the jaws 43 and 44, the spreading member 46 is turned to a position as shown in FIG. 4 in which its longer opposite sides extend parallel to the two tong arms 41 and 42 and are spaced therefrom so that the screw 24 will be gripped by the jaws 43 and 44 under the action of spring 45. When not gripping a screw, jaws 43 and 44 engage upon each other. After the screwdriving tool 23 has been lifted to the position as shown in FIG. 2 above the feed rail 52, lever 28 is pivoted in the direction toward the shank of tool 23 to a position in which the first screw 53 extends coaxially to the shank. Shank 23 together with the tong jaws 43 and 44 holding the screw 24 are then lowered to the workpiece 54. However, before the screw engages upon the workpiece, the tip of the screwdriving tool 23 enters the slot of the screw and the tool starts to turn the screw about its longitudinal axis. After the screw has been screwed for a short distance into the workpiece, jaws 43 and 44 are spread apart by the spreading member 46 so as to release the screw which is thereupon screwed fully into the workpiece. During this final screwing operation, jaws 43 and 44 are moved back to their original position at both sides of the next first screw 24 in feed rail 52. While the screwdriving tool 23 is thereafter returned to its original position, the tong jaws 43 and 44 will grip the next screw and move the same underneath the tool 23 which is then in its highest position. The same sequence of operation as previously described is then repeated and the next screw is screwed into another part of the workpiece 54 which in the meantime has been moved to the appropriate position.

Cam plates 8 to 11 and the elements which are associated therewith are designed so as to effect the operations of the apparatus as previously described and may be adjusted in accordance with the particular kind of screws which are to be screwed into the workpiece.

Since the tongs are returned to the feed rail 52 while the screw is being screwed into the workpiece, the total period required for feeding and screwing-in each screw may be very short. Since the screw is rotated within the tongs while being moved toward and against the workpiece, any danger of tilting the screw when engaging upon the workpiece is avoided and the screw will always be properly screwed into the bore of the workpiece coaxially thereto. The tong jaws may be made very narrow so as to permit screws also to be screwed into bores in places which are not easily accessible, for example, when the head of a screw is to be sunk deeply into a bore in a workpiece. In this case, the tong jaws may be provided in the form of two thin half-tubes. If it occurs that a screw has no slot or no thread, it will simply fall laterally out of the tong jaws 43 and 44 when the latter are released from the screw and it will thus not interfere with the further operation.

If stud or worm screws are to be employed, they are fed in axial alignment with each other through a tube at the end of which a one-screw dispensing device is provided. Under the action of spring 45 the tongs will then withdraw the lowest screw which projects from the end of the tube and may be resiliently held therein, while the other screws are held by the dispensing device. This dispensing device which only releases one screw at a time may be controlled by the lever 28.

In place of one or more of the cam plates, it is also possible to employ a hydraulic, pneumatic or magnetic control mechanism which effects the cycle of the operations of the apparatus in a similar manner as previously described.

Although my invention has been illustrated and described with reference to the preferred embodiment thereof, I wish to have it understood that it is in no way limited to the details of such embodiment but is capable of numerous modifications within the scope of the appended claims.

I claim:

1. Device for a successive screwing in screws into bore holes of workpieces and similar objects comprising a screw blade with an arrangement for rotating the screw blade, means for shifting the screw blade in an axial direction toward the workpiece and away from said workpiece, a magazine for holding a plurality of screws, means for successively feeding in screws from the magazine to a place laterally beside the workpiece, means for receiving one of the screws from the end of the feeding means, said receiving means having a pair of pliers with claws, a spreading element for opening and closing the pair of pliers including means for shifting the pliers from a first position receiving a screw in the area of the end of a feed area to a position in which the screw is lying in an axial direction relative to the screw blade and between the workpiece and screw blade in its position pulled back from the workpiece, and means for shifting the pliers in an axial direction of the screw blade with means for controlling the shifting movement of the screw blade and the pliers and the spreading movements of the pliers in a predetermined temporal sequence, so that the rotatable screw blade is to be moved by means of the arrangement for shifting the screw blade in the direction toward the workpiece, so that it will engage with a screw and turn it before it comes into engagement with the workpiece and while it is still held by the pliers, so that said screw is to be screwed in for a short distance into the bore hole of the workpiece and the pliers are opened for the release of the screw and are then returned into its original position by means for the movement of the pliers, in which position it can receive another screw while the screw seized by the screw blade is completely screwed into the workpiece.

2. Device according to claim 1, in which the arrangement for swiveling the pliers has a lever which serves to swivel the pliers from the first into the second position, and said lever being parallel to the axis of the screw blade, an arrangement for swiveling the lever around an axis removed from the pliers and an arrangement for shifting the pliers on and opposite the lever in a direction parallel to the longitudinal axis of the screw blade.